Sept. 22, 1936. A. H. OELKERS 2,054,860
ROLLER BEARING ASSEMBLY
Filed July 10, 1930 2 Sheets-Sheet 1
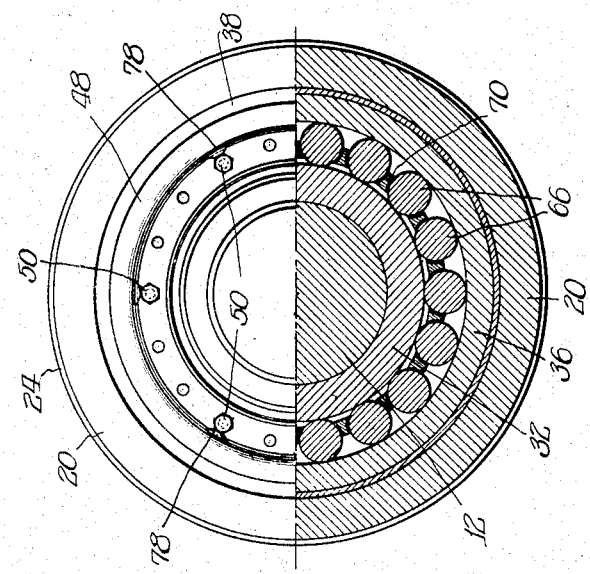
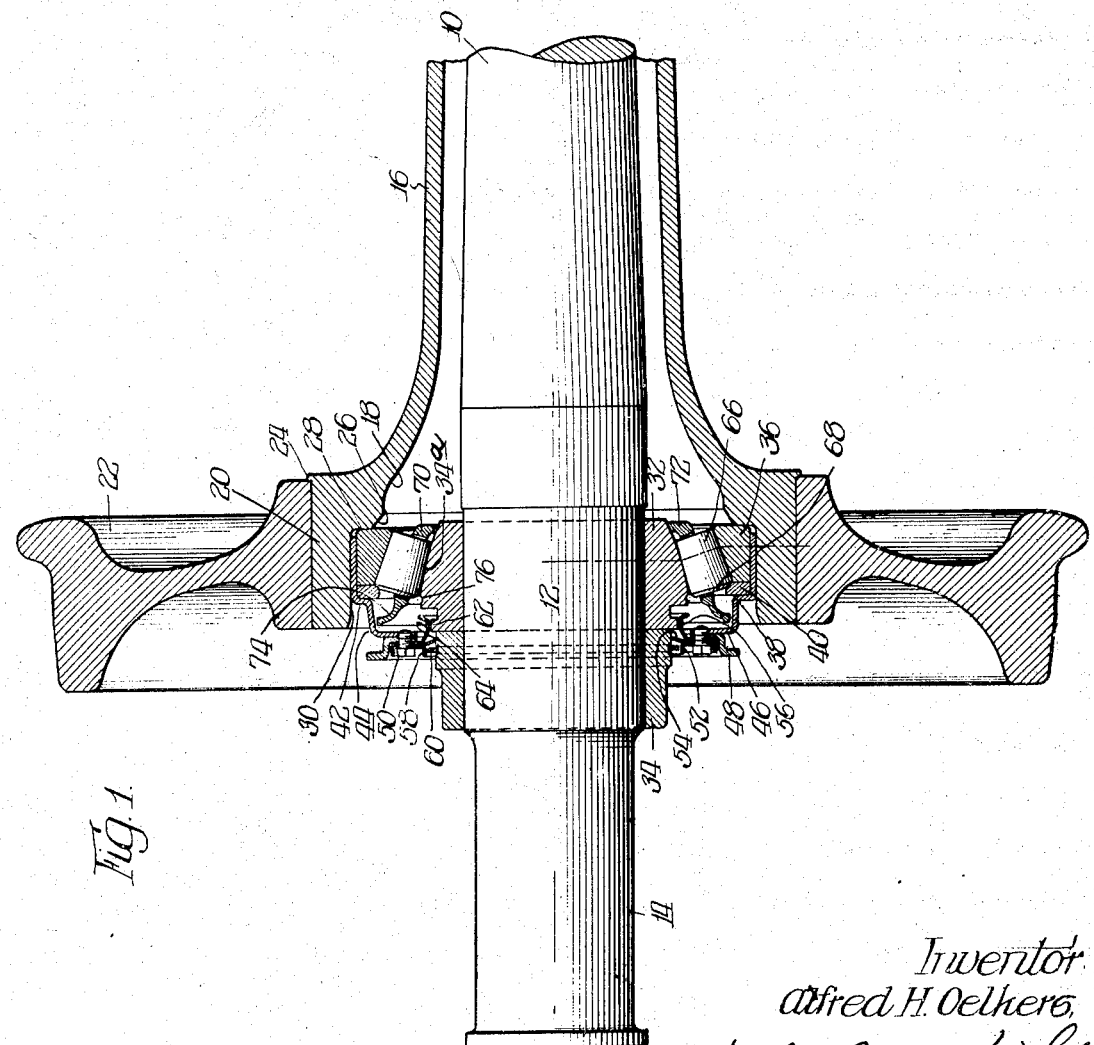
Inventor
Alfred H. Oelkers

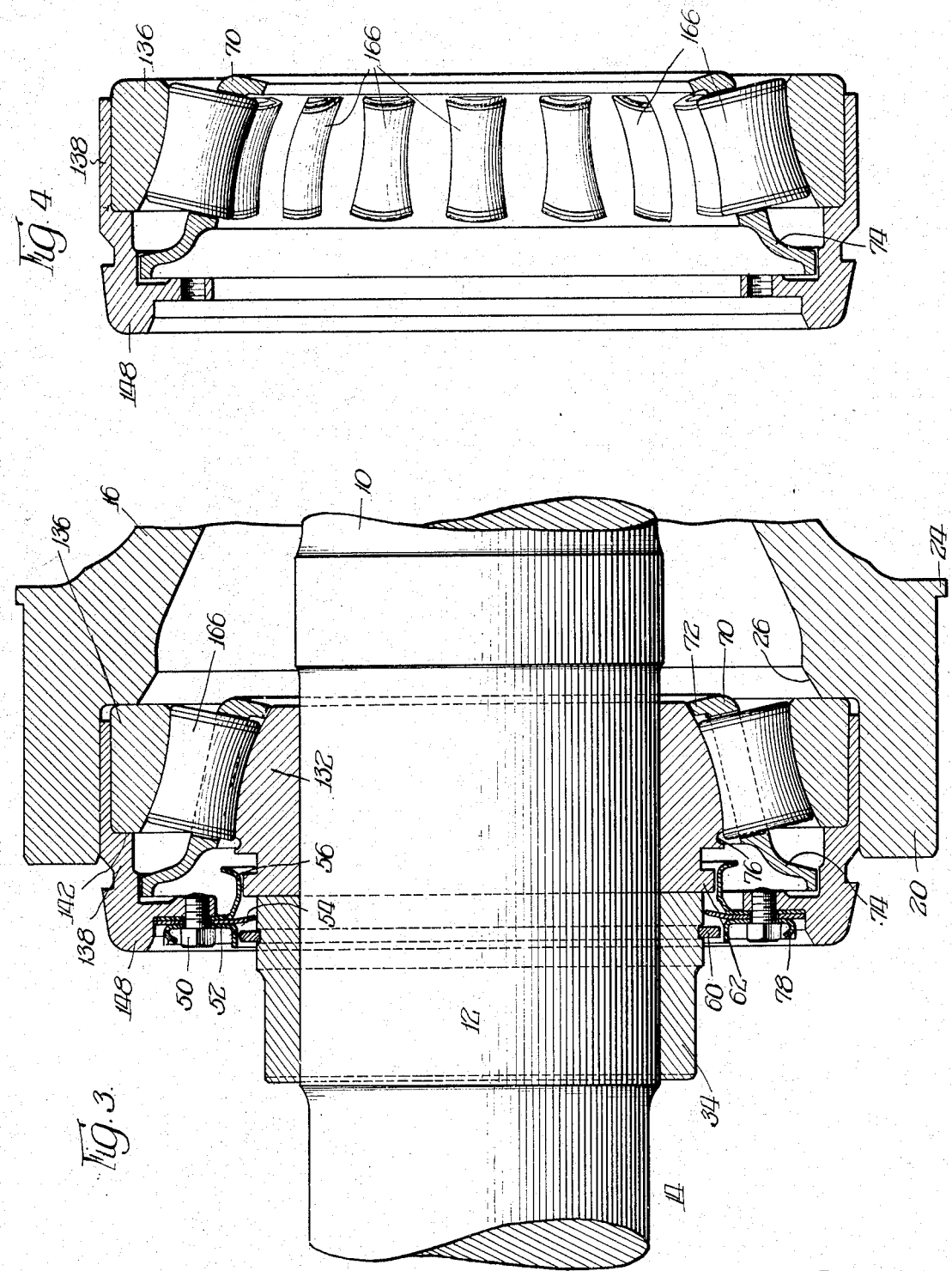

Patented Sept. 22, 1936

2,054,860

UNITED STATES PATENT OFFICE 2,054,860

ROLLER BEARING ASSEMBLY

Alfred H. Oelkers, Chicago, Ill., assignor to American Steel Foundries, Chicago, Ill., a corporation of New Jersey Application July 10, 1930, Serial No. 466,976

31 Claims. (Cl. 295—36)

This invention pertains to railway rolling stock and more particularly to roller bearing units for use therewith.

During the development of roller bearing units it was found that special details of construction were necessary for the bearings to properly function in transmitting different loads. It was also found that in order to have the bearings function properly over a long period of time the bearings must be kept clean and thoroughly lubricated, and moisture must be excluded. Grit and dirt, of course, cause slight wearing away of the surfaces of bearings, rendering the same inefficient. Moisture interferes with the proper lubrication of the bearings and causes or tends to cause corrosion. Some attention must also be paid to providing a bearing which can be easily and effectively asembled with the parts of the roller bearing units, and to this end it is desirable to provide a bearing which is partially self-contained.

In the operation of roller bearing railway axle assemblies it has been found that some difficulties acting to destroy the bearings are encountered. In a bearing and axle assembly such as formerly used in which the bearings are assembled with the inner race or cone of the bearing which is secured on the stationary axle, the axle deflects or bends in actual service, thereby forcing the bearing cone slightly out of alignment with the bearing cup. If, then, the cage which holds the bearings onto one of the bearing members and keeps the rollers spaced is mounted so as to hold the rollers in alignment with the cone, heating and damage to the bearing are experienced.

In a railway axle mounting the bearing cup or outer race revolves with the wheels. The rollers revolve around the axle and within the cup and are constantly being forced outwardly against the cup by centrifugal action with increased pressure directly dependent upon the speed. It is important to design a cage which is itself properly guided to diminish the tendency to drag whereby the individual rollers would be under heavier duty to urge the cage to rotation. Previously, the cage has been guided by the stationary race or bearing cone which tends to retard its rotation, thereby tending to prevent the rollers from being guided by the cup. The most ideal condition is for the rollers and the cage to be guided by the revolving parts of the assembly which tend to carry them along in a parallel plane with respect to the wheels, all the other parts which revolve about the axle also to have the inner, stationary axle only in contact with the surfaces of the rollers on which the radial thrust loads are carried. The bearing cones then, should have no function in guiding travel of the rollers because the cones may be deflected in various positions, depending on the extent of loading.

In a self-contained bearing, where a support is provided for the bearings, under certain conditions the support must be of such character that it will not interfere with the anti-friction properties of the bearings. Most all anti-friction bearings tend to be frictional under certain loadings, working or stressing of the parts of the assembly, and it is therefore an object of this invention to provide a roller bearing assembly which is inexpensive to make and maintain, and, as nearly as possible, functions as an anti-friction bearing under all conditions of operation.

Another object of the invention is to provide a roller bearing assembly wherein the race is free from any influence from non-rotating parts of the assembly, and wherein perforations in the cage in which the individual rollers are carried are set in with respect to the rollers so that each roller may be free to bear against the revolving cup whereby there is a direct tendency to carry the rollers around with the least amount of friction between the cage and rollers.

Still another object of the invention is to provide an anti-friction bearing assembly wherein a part of the bearing may be assembled with a part of the axle assembly, and yet one in which the anti-friction bearing properties of the bearing are not impaired.

A further object of the invention is to provide a construction for a wheel and axle assembly which will positively prevent any tendency of the entrance of foreign matter to the roller bearing, and so proportioned that lubricant is prevented from being drained and is positively supplied to the bearing no matter what the condition of operation of the bearing.

A still further object of the invention is to provide a construction which is readily applicable to existing roller bearing units, and one which is easily applied and serves to maintain the bearings in position.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figure 1 is a fragmentary, sectional elevation through one form of wheel and axle assembly involving the invention;

Figure 2 is a transverse elevation partly in section of the wheel and axle assembly shown in Figure 1, the same being taken substantially in the plane of the longitudinal center line of said assembly;

Figure 3 is an enlarged fragmentary sectional elevation of a different form of wheel and axle assembly involving the invention; and Figure 4 is an enlarged sectional elevation wherein the rollers, cup, cage and casing are shown assembled as a unit for application to a wheel and axle assembly.

In the roller bearing constructions illustrated only certain portions of the assembly are shown and described, though it is understood that the constructions are duplicated at opposite ends of the assemblies. The inner normally non-rotatable axle 10 is provided with a cylindrical bearing receiving portion 12 and a cylindrical end bearing portion 14 which is adapted to extend within the usual standard journal box (not shown) and cooperates with the brasses and wedges therein in a well known manner. The outer rotatable axle 16 is flared at its ends to form a lubricant recess 18 and terminates in a wheel receiving portion 20, the wheel 22 being positioned thereon by means of the shoulder 24. The lubricant recess is beveled as at 26, sloping into a shoulder 28 defining the inner cylindrical bearing receiving portion 30.

In the form of assembly illustrated in Figures 1 and 2, a type of bearing is shown wherein the cone or inner race ring 32 is mounted on the bearing receiving portion 12, said cone being provided with the convexed roller bearing engaging portion 34a, the elements of the cone being portions of a sphere. However, no two elements forming the cone are portions of the same sphere, all as has been described in applicant's co-pending application Serial No. 409,495, filed November 25, 1929, Patent No. 2,023,091, Dec. 3, 1935. The cone is positioned on the portion 12 by means of a shrink collar or ring 34 which is shrunk or press-fitted on said portion, abuts the cone, and maintains the same in operative assembled position.

The outer race ring or cup 36 is pressed into a casing 38 together with a thrust track and cup or thrust shoulder 40 which is shown as a piece separate from the cup, though it will be understood that the same may be integral with said cup. The casing, shown as a pressing, is provided with a shoulder 42 for limiting the position of the thrust track and cup, and is also provided with an outwardly extending portion 44 which is flanged as at 46 to extend inwardly toward the inner axle. The flange 46 is adapted to receive the guard member 48 which is secured thereto by means of the bolts 50, said bolts serving also to secure the rings 52, 54 and 56, forming the cover plate, to the flange 46. The guard member 48 is flanged and reflanged to form a dished member which extends outwardly of the head of the bolt, and the member 52 is provided with an outwardly extending flange 58 disposed adjacent the baffle ring 60 which is contained in a proper groove formed in the shrink collar 34.

The cone is provided with an outwardly extending shoulder 62 forming in effect another baffle ring, and the member 54 is extended inwardly toward the inner axle to be disposed between the baffle ring 60 and the shoulder 62. The inner member 56 is flanged to form a groove 64 adjacent the shoulder 62, the construction being such that the groove 64 may act to conduct lubricant downwardly toward the bottom of the lubricant recess when the assembly has been brought to a stop, and to pump lubricant toward the bearings while the car is in motion. The disposition of the members 52, 54, and 56 is such that dirt, grit, etc., will be positively kept out of the lubricant recess.

Each of the rollers 66 disposed between the cone and the cup are of the tapered type having a frusto-conical section for contact with the cone and cup, the disposition being such that under full load the contact on the cone will be adjacent the center of the roller, and the rollers are provided at their larger ends with steeper frusto-conical portions 68 adapted to have contact with a correspondingly sloping shoulder formed on the thrust member 40 whereby end thrust is taken anti-frictionally. The rollers are spaced and positioned in the cage 70, which cage, as shown, is a casting and contacts the rollers inwardly of the axes thereof. The cage is provided with an inwardly directed flange 72 at its smaller diameter and an outwardly directed flange 74 at its larger diameter, the flange 72 being disposed and spaced from the cone so that lubricant may facilitate its movement, while guiding is principally effected from the rotating casing through flange 74.

The curve of the flange 74 serves to form a lubricant trough for directing lubricant to the rollers whereby the rollers are effectively lubricated under all conditions, and the cone is provided with the groove 76 for further facilitating lubrication of the rollers. In operation, the rollers tend to whirl off the lubricant at their larger ends, and the groove 76 is provided to receive the lubricant and direct it back toward the end of the bearings, thereby facilitating lubrication, particularly of the cone. The outer plate member 52 of the casing may be provided with inwardly directed or depressed portions 78 put in the member after assembly of the casing, cup, bearings, race and outer plate members for preventing release of the bolts 50.

In the form of assembly illustrated in Figure 3 a similar construction is used, with the exception that the bearings are of the Shafer type wherein the cone 132 is provided with a bearing engaging surface which is a portion of a true sphere, and cooperates with the Shafer type of bearing 166, the bearing having outer contact with the cup 136 disposed in the housing or casing 138. In this instance the casing is a casting instead of a pressing and is provided with the shoulder 142 adapted to determine the position of the cup. The casing, then, is provided with the outwardly extending portion 148 providing a guide or protective device for the bolts 50 securing the plates 52, 54, and 56 in position as has already been described, the plate 52 being provided with the depressed portion 78 for locking the bolts 50 in position. The cone of course is positioned by means of the shrink collar 34 provided with the baffle ring 60, the other parts of the assembly being exactly the same as before described. The cone is also provided with the groove 76 for directing lubricant to the ends of the bearings, and the cage 70 is also provided.

In assembly, both types of bearings shown are first pressed into the casing together with the anti-friction bearings and cage, this assembly forming a unit of the entire assembly whereby it may readily be pressed into position in the outer axle, and the assembly completed by the cone and cover plate forming members 52, 54, and 56. This unitary assembly is very advantageous in facilitating shipments for repair or assembly at points remote from the factory, as oftentimes the bearings of associated parts are manufactured at an entirely different place from the wheels and axles.

It will thus be appreciated that with the form of device shown a readily lubricated construction is provided, one which is positively kept free from grit and dirt, and it is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In an axle assembly, the combination of an outer rotary axle having an enlarged hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink collar mounted on said inner axle for positioning said anti-friction bearings, and cover plate means mounted on said outer axle and extending toward said shrink collar, said cover plate means having portions extending toward and away from said bearings and substantially parallel to said inner axle.

2. In an axle assembly, the combination of an outer rotary axle having an enlarged hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink collar mounted on said inner axle for positioning said anti-friction bearings, and cover plate means mounted on said outer axle and extending toward said shrink collar, said shrink collar having a baffle ring thereon, said cover plate means having portions extending toward and away from said baffle rings and substantially parallel to said inner axle.

3. In an axle assembly, the combination of an outer rotary axle having an enlarged hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, and cover plate means mounted on said outer axle and extending toward said shrink ring, said shrink ring having a baffle ring thereon, said cover plate means having portions extending toward and away from said baffle ring, one of said portions having a channel formed therein for directing the lubricant toward a portion of said bearing recess.

4. In an axle assembly, the combination of an outer rotary axle having an enlarged hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, cover plate means mounted on said outer axle and extending toward said shrink ring, said shrink ring having a baffle ring thereon, said cover plate means having portions extending toward and away from said baffle ring, one of said portions having a channel formed therein for directing the lubricant toward a portion of said bearing recess, and means adjacent said anti-friction bearings for directing lubricant toward said bearings.

5. In an axle assembly, the combination of an outer rotary axle having an enlarged hub portion and a bearing recess, an inner substantially non-rotatable axle extending through said outer axle and having a bearing portion thereon, anti-friction bearings mounted between said axles and in said bearing recess, a shrink collar mounted on said inner axle for positioning said anti-friction bearings, and cover plate means mounted on said outer axle and extending toward said shrink collar, said cover plate means having portions extending axially toward and away from said bearings.

6. In an axle assembly, the combination of an outer rotary axle having an enlarged hub portion and a bearing recess, an inner substantially non-rotatable axle extending through said outer axle and having a bearing portion thereon, anti-friction bearings mounted between said axles and in said bearing recess, a shrink collar mounted on said inner axle for positioning said anti-friction bearings, and cover plate means mounted on said outer axle and extending toward said shrink collar, said shrink collar having a baffle ring thereon, said cover plate means having portions extending toward and away from said baffle ring.

7. In an axle assembly, the combination of an outer rotary axle having an enlarged hub portion and a bearing recess, an inner substantially non-rotatable axle extending through said outer axle and having a bearing portion thereon, anti-friction bearings mounted between said axles and in said bearing recess, a shrink ring mounted on said inner axle for positioning said anti-friction bearings, and cover plate means mounted on said outer axle and extending toward said shrink ring, said shrink ring having a baffle ring thereon, said cover plate means having portions extending toward and away from said baffle ring, one of said portions having a channel formed therein for directing the lubricant toward a portion of said bearing recess.

8. In an axle assembly, the combination of an outer rotary axle having an enlarged hub portion and a bearing recess, an inner substantially non-rotatable axle extending through said outer axle and having a bearing portion thereon, anti-friction bearings mounted between said axles and in said bearing recess, a shrink ring mounted on said inner axle for positioning said anti-friction bearings, cover plate means mounted on said outer axle and extending toward said shrink ring, said shrink ring having a baffle ring thereon, said cover plate means having portions extending toward and away from said baffle ring, one of said portions having a channel formed therein for directing the lubricant toward a portion of said bearing recess, and means adjacent said anti-friction bearings for directing lubricant toward said bearings.

9. In a wheel and axle assembly, the combination of an outer rotary axle having an enlarged wheel hub portion and a bearing recess, an inner substantially non-rotatable axle extending through said outer axle and having a bearing portion thereon, anti-friction bearings mounted between said axles and in said bearing recess adapted to take end thrust and permit deflection and whipping of said inner axle, and a cage for said anti-friction bearings, said cage having a diverging guide member extending toward and adapted to be guided by said outer axle.

10. A unit assembly for a roller bearing axle including a revoluble casing having a positioning shoulder thereon, a race ring disposed therein and abutting said shoulder, anti-friction members cooperating with said race ring, and means for retaining and spacing said anti-friction members, said means having a portion extending toward said casing, said portion providing a lubricant channel for directing lubricant to said members.

11. A unit assembly for a roller bearing axle including a revoluble casing, a race ring disposed therein, anti-friction members cooperating with said race ring, and means for retaining and spacing said anti-friction members, said means having a portion extending toward and cooperating with said casing for operating movement thereof.

12. A unit assembly for a roller bearing axle including a revoluble casing, a race ring disposed therein, anti-friction members cooperating with said race ring, and means for retaining and spacing said anti-friction members in said assembly, said means cooperating with said casing whereby the retaining means is rotated thereby, said casing having a member for receiving a cover plate.

13. A unit assembly for a roller bearing axle including a revoluble casing, a race ring disposed therein, anti-friction members cooperating with said race ring, means for retaining and spacing said anti-friction members in said assembly, said casing having a member for receiving a cover plate, a cover plate secured to said member, said means cooperating with said casing whereby the retaining means is rotated thereby, and guard means extending outwardly of said cover plate.

14. A unit assembly for a roller bearing axle including a revoluble casing, a race ring disposed therein, anti-friction members cooperating with said race ring, and means for retaining and spacing said anti-friction members in said assembly, said means having a portion extending toward and cooperating with said casing whereby the retaining means is rotated thereby, said casing having a member for receiving a cover plate.

15. A unit assembly for a roller bearing axle including a casing, a race ring disposed therein, anti-friction members cooperating with said race ring, means for retaining and spacing said anti-friction members, said means having a portion extending toward said casing for operating movement thereof, said casing having a member for receiving a cover plate, and guard means extending outwardly of said cover plate.

16. A unit assembly for a roller bearing axle including a revoluble casing, a race ring disposed therein, anti-friction members cooperating with said race ring, and means for retaining and spacing said anti-friction members in said assembly, said casing having a shoulder for positioning said race ring, said means cooperating with said casing whereby the retaining means is rotated thereby.

17. A cover plate for closing the bearing recess of a roller bearing assembly, said cover plate including a plurality of inwardly extending members, means for securing said cover plate in operative position with respect to said roller bearing assembly, one of said members having a depressed portion for locking said securing means in position.

18. In an axle assembly, the combination of an outer rotary axle, an inner substantially non-rotatable axle extending through said outer axle, anti-friction bearings mounted between said axles, means for securing said bearings to said axles, said securing means including a casing disposed between said bearings and one of said axles, and a cage for said anti-friction members having a guide portion cooperating with said casing.

19. In an axle assembly, the combination of an outer rotary axle, an inner substantially non-rotatable axle extending through said outer axle, anti-friction bearings mounted between said axles, said bearings including anti-friction members, means for securing said bearings to said axles, said securing means including a casing disposed between said bearings and one of said axles, and a thrust member fixed to said casing, said anti-friction members having a portion cooperating with said thrust member.

20. In an axle assembly, the combination of an outer rotary axle, an inner substantially non-rotatable axle extending through said outer axle, anti-friction bearings mounted between said axles, said bearings including anti-friction members and cooperating races, means for securing said bearings to said axles, said securing means including a casing disposed between said bearings and one of said axles, and means in one of said races for directing lubricant to said anti-friction members.

21. In an axle assembly, the combination of an outer rotary axle, an inner substantially non-rotatable axle extending through said outer axle, anti-friction bearings mounted between said axles, said bearings including anti-friction members and cooperating races, means for securing said bearings to said axles, said securing means including a casing disposed between said bearings and said outer axle, and means in one of said races for directing lubricant to said anti-friction members.

22. In an axle assembly, the combination of an outer rotary axle, an inner substantially non-rotatable axle extending through said outer axle, anti-friction bearings mounted between said axles, said bearings including anti-friction members and cooperating races, means for securing said bearings to said axles, said securing means including a casing disposed between said bearings and one of said axles, means in one of said races for directing lubricant to said anti-friction members, and a cage for said anti-friction members having a guide portion cooperating with said casing.

23. In an axle assembly, the combination of an outer rotary axle, an inner substantially non-rotatable axle extending through said outer axle, anti-friction bearings mounted between said axles and in said bearing recess, said bearings including anti-friction members and cooperating races, means for securing said bearings to said axles, said securing means including a casing disposed between said bearings and one of said axles and having a thrust member mounted therein, said anti-friction members having a portion cooperating with said thrust member, and a cage for said anti-friction members having a guide portion cooperating with said casing.

24. In an axle assembly, the combination of an inner axle, an outer axle rotatable relative to said inner axle, an anti-friction bearing mounted between said axles, said anti-friction bearing including inner and outer race rings and anti-friction rollers cooperating therewith, retaining means mounted on one of said axles on which one of said race rings is mounted, and a cage for said rollers having a portion adapted to cooperate with said retaining means whereby said cage is guided thereby.

25. In an axle assembly, the combination of an inner axle, an outer axle rotatable with respect to said inner axle, an anti-friction bearing mounted between said axles, said anti-friction bearing including inner and outer race rings and anti-friction rollers cooperating therewith, retaining means secured to said outer axle on which one of said race rings is mounted, and a cage for said rollers having a portion adapted to cooperate with said retaining means whereby said cage is guided thereby.

26. In an axle assembly, the combination of an inner axle, an outer axle rotatable relative to said inner axle, an anti-friction bearing mounted between said axles, said anti-friction bearing including inner and outer race rings and anti-friction rollers cooperating therewith, retaining means mounted on one of said axles on which one of said race rings is mounted, a cage for said rollers having a portion adapted to cooperate with said retaining means whereby said cage is guided thereby, and means secured to said retaining means for closing the space between said axles to retain lubricant for said bearing.

27. In an axle assembly, the combination of an inner axle, an outer axle rotatable with respect to said inner axle, an anti-friction bearing mounted between said axles, said anti-friction bearing including inner and outer race rings and anti-friction rollers cooperating therewith, retaining means secured to said outer axle on which one of said race rings is mounted, a cage for said rollers having a portion adapted to cooperate with said retaining means whereby said cage is guided thereby, and means secured to said retaining means for closing the space between said axles to retain lubricant for said bearing.

28. A cover plate for closing the bearing recess of a roller bearing assembly, said cover plate including a plurality of inwardly extending members, one of said members extending inwardly to a greater extent than the others, said other members extending laterally of said first-mentioned member.

29. A cover plate for closing the bearing recess of a roller bearing assembly, said cover plate including a plurality of inwardly extending members, one of said members extending inwardly to a greater extent than the others, said other members extending in opposite relation laterally of said first-mentioned member.

30. A cover plate for a roller bearing assembly including an intermediate substantially plane inwardly extending member and a member connected to each side of said first-named member and having oppositely disposed and laterally extending portions, one of said portions being provided with means forming a lubricant channel.

31. A cover plate for closing the bearing recess of a roller bearing assembly, said cover plate including an intermediate substantially plane inwardly extending member, and a member connected to each side of said first-named member having oppositely disposed and laterally extending portions, said first-named member extending inwardly to a greater extent than said portions.

ALFRED H. OELKERS.